(12) United States Patent
Patwardhan et al.

(10) Patent No.: US 8,984,027 B1
(45) Date of Patent: Mar. 17, 2015

(54) SYSTEMS AND METHODS FOR MIGRATING FILES TO TIERED STORAGE SYSTEMS

(75) Inventors: Kedar Patwardhan, Pune (IN); Shailesh Marathe, Pune (IN); Sanjay Jain, Pune (IN); Niranjan Pendharkar, Pune (IN)

(73) Assignee: Symantec Corporation, Mountain View, CA (US)

( * ) Notice: Subject to any disclaimer, the term of this patent is extended or adjusted under 35 U.S.C. 154(b) by 288 days.

(21) Appl. No.: 13/193,087

(22) Filed: Jul. 28, 2011

(51) Int. Cl.
*G06F 17/30* (2006.01)
(52) U.S. Cl.
USPC .......................................... 707/809; 707/812
(58) Field of Classification Search
CPC ............ G06F 17/30221; G06F 3/0647; G06F 3/0649; G06F 17/30079; G06F 3/0617; G06F 3/0622
USPC .................................. 707/640, 661, 809, 812
See application file for complete search history.

(56) References Cited

U.S. PATENT DOCUMENTS

| | | | |
|---|---|---|---|
| 7,007,048 B1 * | 2/2006 | Murray et al. ........................ 1/1 |
| 7,225,211 B1 * | 5/2007 | Colgrove et al. ............. 707/693 |
| 8,180,742 B2 * | 5/2012 | Claudatos et al. ............ 707/694 |
| 2004/0039891 A1 * | 2/2004 | Leung et al. .................. 711/165 |
| 2005/0021566 A1 * | 1/2005 | Mu ................................. 707/200 |
| 2006/0004868 A1 * | 1/2006 | Claudatos et al. ......... 707/104.1 |
| 2006/0059172 A1 * | 3/2006 | Devarakonda ................ 707/100 |
| 2007/0260640 A1 * | 11/2007 | Hamilton et al. ............. 707/200 |
| 2009/0300079 A1 * | 12/2009 | Shitomi ........................ 707/204 |
| 2010/0274825 A1 * | 10/2010 | Nemoto et al. ............... 707/812 |

OTHER PUBLICATIONS

IBM; Softek TDMF for UNIX; http://www-935.ibm.com/services/us/index/wss/offering/gts/a1028195; Take from site on Mar. 7, 2011.
Opensolaris; Data Migration Manager; http://hub.opensolaris.org/bin/view/Project+dmm/; Taken from site on Mar. 7, 2011.

* cited by examiner

*Primary Examiner* — Shiow-Jy Fan
(74) *Attorney, Agent, or Firm* — ALG Intellectual Property, LLC

(57) ABSTRACT

A computer-implemented method for migrating files to tiered storage systems may include 1) identifying at least one file to migrate from a first file system to a second file system, where the second file system may include a plurality of storage tiers, 2) identifying file metadata associated with the file as stored on the first file system, 3) before writing the file to the second storage system, selecting a storage tier from the plurality of storage tiers based at least in part on the file metadata, and 4) writing the file directly to the selected storage tier within the second file system to avoid moving the file to the selected storage tier after writing the file to the second file system. Various other methods, systems, and computer-readable media are also disclosed.

18 Claims, 6 Drawing Sheets

SYSTEMS AND METHODS FOR MIGRATING FILES TO TIERED STORAGE SYSTEMS

BACKGROUND

Organizations store increasingly large amounts of data. In order to more effectively use the capabilities of differing storage devices, an organization may use a tiered storage system. Tiered storage systems may differentiate between storage devices and move certain files to a particular storage device selected based on the properties of the files and/or the capabilities of the storage device. For example, a "high" storage tier may provide one or more superior features (e.g., superior input/output performance) as compared to a "low" storage tier.

Unfortunately, executing storage tiering policies (i.e., moving a file to the appropriate storage tier) may require input/output operations, potentially degrading primary application performance. This problem may be especially acute when many files are added to a tiered storage system, since the tiered storage system may then have many files to process and/or move. Furthermore, when migrating files from one file system to another, file metadata that is ordinarily used by tiered storage systems to determine the appropriate storage tier may be lost and/or replaced. Accordingly, the instant disclosure identifies a need for additional and improved systems for migrating files to tiered storage systems.

SUMMARY

As will be described in greater detail below, the instant disclosure generally relates to systems and methods for migrating files to tiered storage systems. Systems and methods described herein may migrate files to tiered storage systems by writing files directly to the appropriate storage tier at the target file system based on the metadata of the files at the source target system (and, e.g., based on the storage tiering policies at the target file system).

For example, a method may include identifying at least one file to migrate from a first file system to a second file system. The second file system may include a plurality of storage tiers. The method may also include identifying file metadata associated with the file as stored on the first file system. The method may additionally include, before writing the file to the second storage system, selecting a storage tier from the plurality of storage tiers based at least in part on the file metadata. The method may also include writing the file directly to the storage tier within the second file system to avoid moving the file to the storage tier after writing the file to the second file system.

In another example, a system may include one or more processors configured to execute an identification module, a metadata module, a selection module, and a writing module. The identification module may be programmed to identify at least one file to migrate from a first file system to a second file system. The second file system may include a plurality of storage tiers. The metadata module may be programmed to identify file metadata associated with the file as stored on the first file system. The selection module may be programmed to select a storage tier from the plurality of storage tiers based at least in part on the file metadata. The writing module may be programmed to write the file directly to the storage tier within the second file system to avoid moving the file to the storage tier after writing the file to the second file system.

The identification module may be programmed to identify the file to migrate in a variety of contexts. For example, the identification module may be programmed to identify a request to migrate the first file system to the second file system. Additionally or alternatively, the identification module may be programmed to identify a backed up file to restore to the second file system.

The metadata module may be programmed to identify any of a variety of file metadata. For example, the metadata module may be programmed to identify the access time of the file, the modification time of the file, the owner of the file, the file type of the file, the size of the file, the name of the file, the name of a directory where the file is located, and/or the path of the file. In some examples, where the file is a backed up file, the metadata module may be programmed to identify the file metadata preserved in a backup of the file.

The selection module may be programmed to select the storage tier based on the file metadata in any suitable manner. For example, the selection module may be programmed to identify at least one storage tiering policy for the second file system for assigning files within the second file system among the plurality of storage tiers. The selection module may also be programmed to then select the storage tier for the file by applying the file metadata to the storage tiering policy. The selection module may apply the file metadata to the storage tiering policy by using the file metadata to determine to which storage tier the storage tiering policy indicates the file should be stored.

The writing module may be programmed to write the file to the storage tier in any of a variety of contexts. For example, the writing module may be programmed to write the file to the storage tier within the second file system while the first file system is online. Additionally or alternatively, the writing module may be programmed to write the file to the storage tier without first writing the file to a second storage tier within the plurality of storage tiers.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
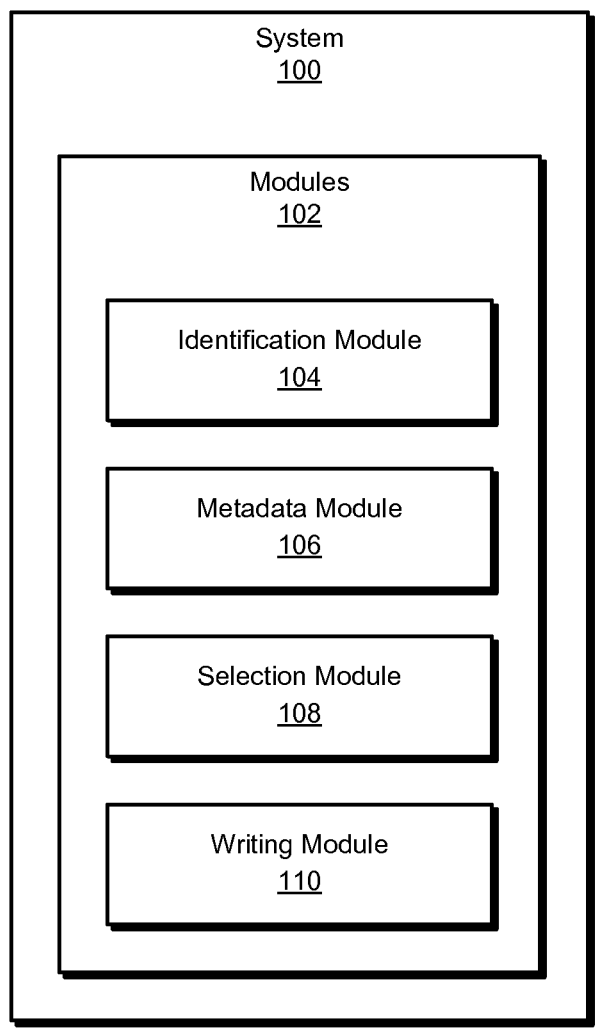
FIG. 1 is a block diagram of an exemplary system for migrating files to tiered storage systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for migrating files to tiered storage systems. Systems and methods described herein may migrate files to tiered storage systems by writing files directly to the appropriate storage tier at the target file system based on the metadata of the files at the source target system (and, e.g., based on the storage tiering policies at the target file system).

By writing files directly to the correct storage tier during migration instead of simply writing the files to the target file system and leaving the tiered storage system to move the files to the correct storage tier, these systems and methods may eliminate the input/output operations that the tiered storage system would otherwise perform to move the files. Additionally, by using the file metadata from the source file system (which may otherwise be lost) to determine the correct storage tier, these systems and methods may outperform the tiered storage system in selecting a storage tier.

Figure 2:
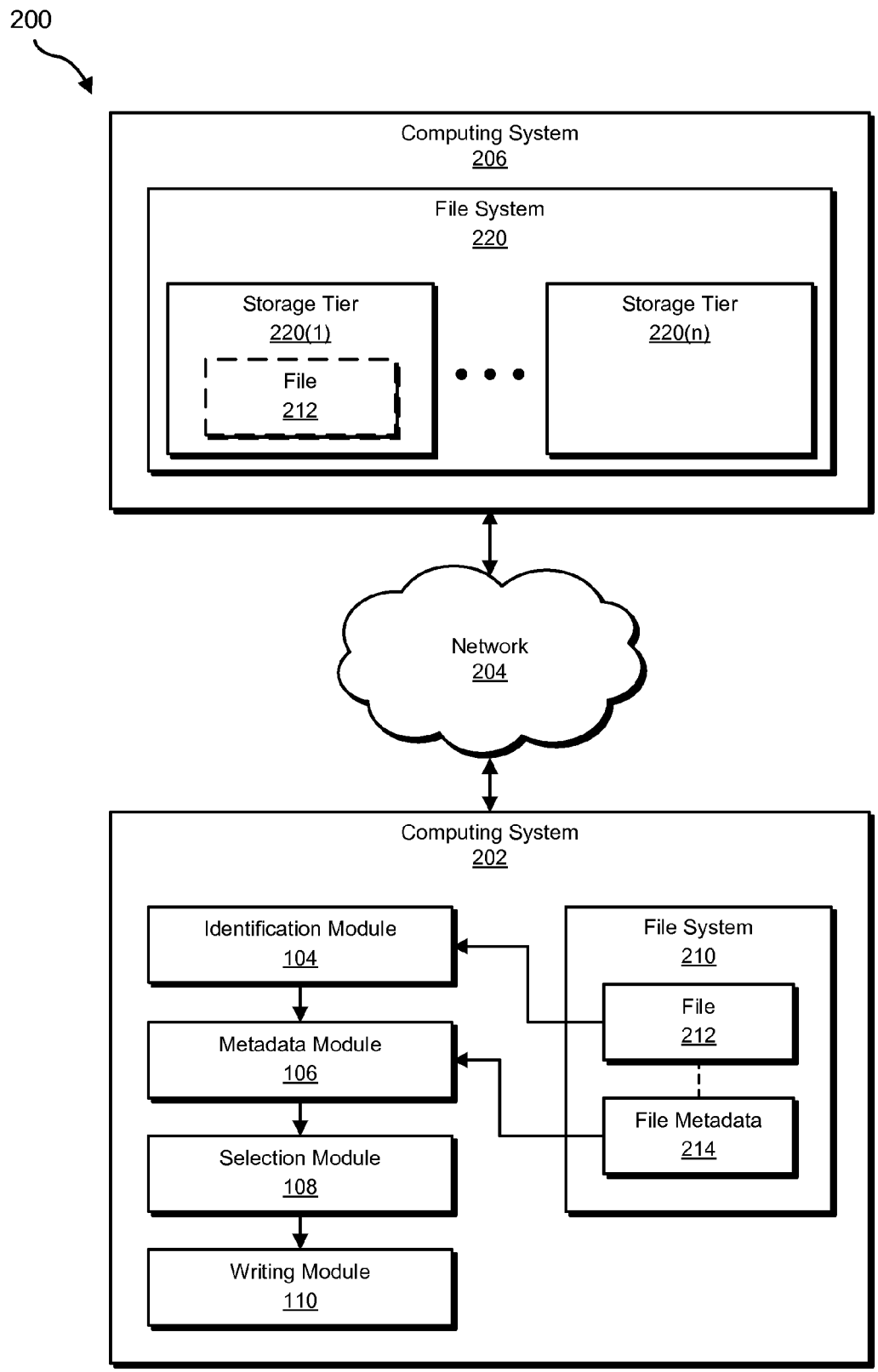
FIG. 2 is a block diagram of an exemplary system for migrating files to tiered storage systems.
Figure 3:
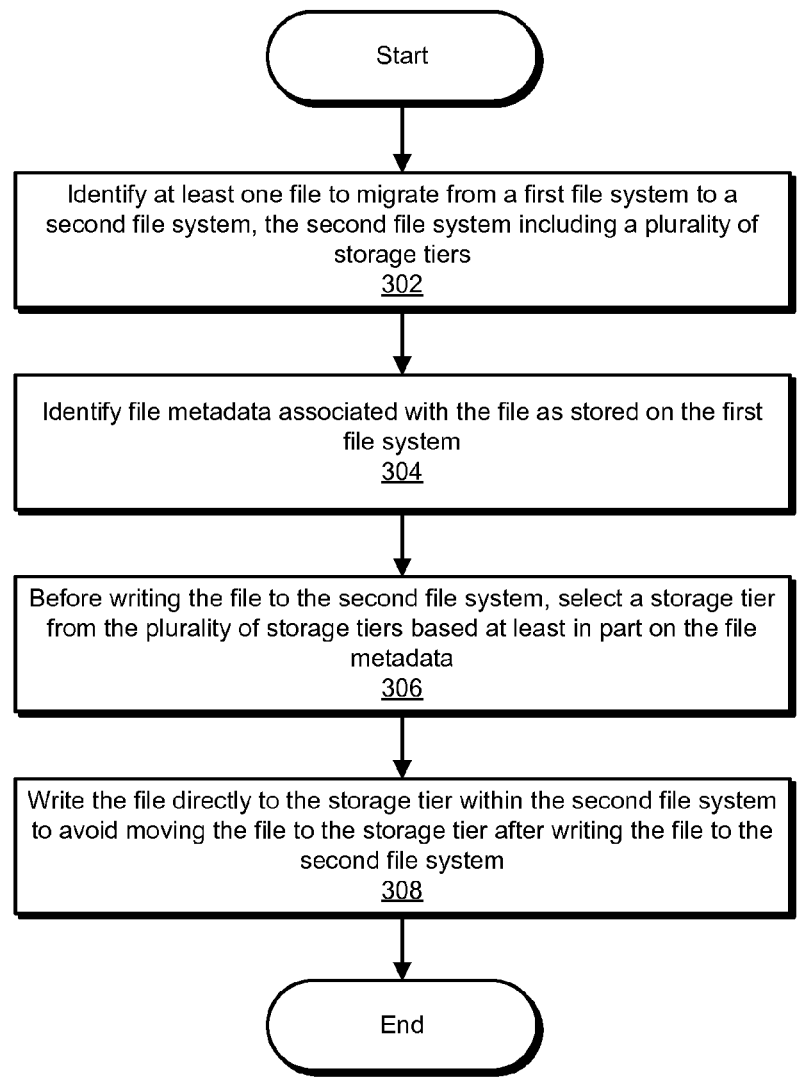
FIG. 3 is a flow diagram of an exemplary method for migrating files to tiered storage systems.
Figure 4:
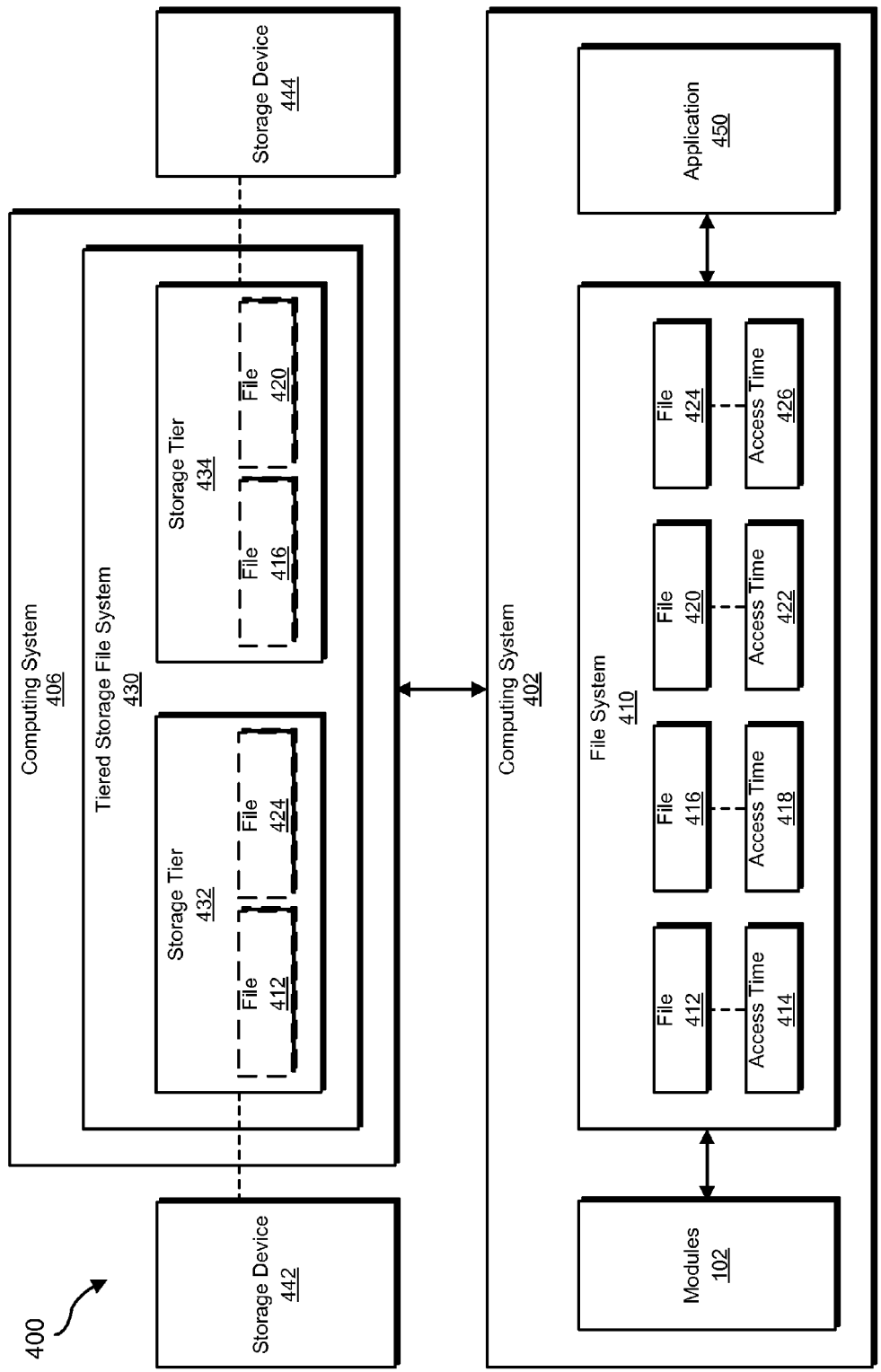
FIG. 4 is a block diagram of an exemplary system for migrating files to tiered storage systems.

The following will provide, with reference to FIGS. 1, 2, and 4, detailed descriptions of exemplary systems for migrating files to tiered storage systems. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for migrating files to tiered storage systems. As illustrated in this figure, exemplary system 100 may include one or more modules 102 for performing one or more tasks. For example, and as will be explained in greater detail below, exemplary system 100 may include an identification module 104 programmed to identify at least one file to migrate from a first file system to a second file system. The second file system may include a plurality of storage tiers. Exemplary system 100 may also include a metadata module 106 programmed to identify file metadata associated with the file as stored on the first file system.

In addition, and as will be described in greater detail below, exemplary system 100 may include a selection module 108 programmed to select a storage tier from the plurality of storage tiers based at least in part on the file metadata. Exemplary system 100 may also include a writing module 110 programmed to write the file directly to the storage tier within the second file system to avoid moving the file to the storage tier after writing the file to the second file system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 202 and/or computing system 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of exemplary system 200 illustrated in FIG. 2. As shown in FIG. 2, system 200 may include a computing system 202 in communication with a computing system 206 via a network 204. FIG. 2 depicts an exemplary context for file migration in which a file may be migrated from computing system 202 to computing system 206. In one embodiment, and as will be described in greater detail below, computing system 202 may include identification module 104, metadata module 106, selection module 108, and writing module 110.

Identification module 104 may be programmed to identify a file 212 to migrate from a file system 210 within computing system 202 to a file system 220 within computing system 206. File system 220 may include a plurality of storage tiers 220(1)-(n). Metadata module 106 may be programmed to identify file metadata 214 associated with file 212 as it is stored on file system 210. Selection module 108 may be programmed to select storage tier 220(1) the plurality of storage tiers 220(1)-(n) based at least in part on file metadata 214. Writing module 110 may be programmed to write file 212 directly to storage tier 220(1) within file system 220 to avoid moving file 212 to storage tier 220(1) after writing file 212 to file system 220.

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Computing system 206 generally represents any type or form of computing device capable of reading computer-executable instructions. Examples of computing system 206 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing system 202 and computing system 206.

FIG. 3 is a flow diagram of an exemplary computer-implemented method 300 for migrating files to tiered storage systems. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify at least one file to migrate from a first file system to a second file system. For example, at step 302 identification module 104 may, as part of computing system 202, identify file 212 to migrate from file system 210 to file system 220.

As used herein, the term "migrate" may refer to moving a file to a different file system in any of a variety of contexts. For example, an administrator may migrate files from one file system to another in order to change file system types. As will be described in greater detail below, in some examples the migration may entail an online migration (i.e., moving files from one file system to another while allowing access to the source file system). In some examples, the term "migrate" may simply refer to moving and/or copying a file from one file system to another. As used herein, the phrase "file system" may refer to any system for organizing, managing, and/or storing files.

As used herein, the term "storage tier" may refer to any storage destination within a tiered storage system. In some examples, a high storage tier may provide one or more superior storage features over a low storage tier. For example, a high storage tier may provide superior reliability, input/output performance, data availability, security features, etc. Additionally or alternatively, a storage tier may provide storage characteristics that are optimized for files with certain characteristics. In some examples, a storage tier may include a physical storage device. Additionally or alternatively, a storage tier may include a logical storage device. For example, the logical storage device may include a virtual storage device. The virtual storage device may be configured to provide storage capabilities as required by the storage tier. Generally, the phrase "storage tier" may refer to any classification, categorization, and/or arrangement of storage. For example, a collection of storage devices may be arranged into tiers according to a required level of service. In a tiered storage system, storage tiers may be arranged according to a variety of characteristics. For example, storage tiers may be organized based on underlying storage medium (e.g., solid state drive, hard disk drive, etc.), the underlying storage configuration (e.g., striped, mirrored, etc.), or the like.

Identification module 104 may identify the file to migrate in a variety of contexts. For example, identification module 104 may identify a request to migrate the first file system to the second file system. Identification module 104 may, in course of processing the request, identify each file within the first file system, including the file.

In some contexts, identification module 104 may identify a backed up file to restore to the second file system. For example, identification module 104 may identify a request to restore a backed up file system (e.g., the first file system) to the second file system.

FIG. 4 is a block diagram of an exemplary system 400 for migrating files to tiered storage systems. As illustrated in FIG. 4, a computing system 402 may include a file system 410 and a computing system 406 may include a tiered storage file system 430. In this example, identification module 104 may, as a part of computing system 402, identify a file 416 to migrate to tiered storage file system 430.

Returning to FIG. 3, at step 304 one or more of the systems described herein may identify file metadata associated with the file as stored on the first file system. For example, at step 304 metadata module 106 may, as part of computing system 202, identify file metadata 214 associated with file 212 on file system 210. Using FIG. 4 as another example, at step 304 metadata module 106 may, as a part of computing system 402, identify an access time 418 of file 416.

Metadata module 106 may identify any of a variety of file metadata. For example, metadata module 106 may identify the access time of the file. For example, metadata module 106 may identify the time of the latest read performed on the file. Additionally or alternatively, metadata module 106 may identify the time of the latest modification to the file. In some examples, the metadata may include more complex access information, such as a temperature score indicating a combination of how frequently and recently the file has been accessed. As mentioned earlier, some file metadata (such as access times) may be lost when a file is migrated to a new file system. Accordingly, by identifying the file metadata of the file as it exists on the first file system, metadata module 106 may retain information that would otherwise be lost for use in selecting a storage tier for the file.

In some examples, metadata module 106 may identify a file owner identifier of the file (e.g., an owner name, a group name, etc.). Additionally or alternatively, metadata module 106 may identify a file type of the file (e.g., whether the file is a word processing document, a multimedia file, an executable file, a configuration file, etc.). In some examples, metadata module 106 may identify the size of the file. As another example, metadata module 106 may identify the path of the file. Generally metadata module 106 may identify any metadata relevant to selecting a storage tier for the file.

As mentioned earlier, in some examples, identification module 104 may identify a backed up file to restore to the second file system. In these examples, metadata module 106 may identify the file metadata as it is preserved in a backup of the file. For example, the backup of the file may include metadata such as the path of the file, access times for the file, etc.

Returning to FIG. 3, at step 306 one or more of the systems described herein may, before writing the file to the second file system, select a storage tier from the plurality of storage tiers based at least in part on the file metadata. For example, at step 306 selection module 108 may, as part of computing system 202, select storage tier 220(1) from storage tiers 220(1)-(*n*) based at least in part on file metadata 214. Using FIG. 4 as another example, at step 306 selection module 108 may, as a part of computing system 402, select a storage tier 434 from between a storage tier 432 and storage tier 434 based at least in part on access time 418.

Selection module 108 may select the storage tier based on the file metadata in any suitable manner. For example, selection module 108 may identify at least one storage tiering policy (e.g., a policy indicating an appropriate storage tier for a file having a characteristic identified in the policy) for the second file system for assigning files within the second file system among the plurality of storage tiers. For example, a tiered storage system for the first file system may include configuration data specifying one or more storage tiering policies for distributing files among the plurality of storage tiers. In some examples, selection module 108 may locate the configuration data and extract the storage tiering policies. For example, selection module 108 may scan for the configuration data on the second file system. Additionally or alternatively, selection module 108 may access a setting that discloses the location of the configuration data. In some examples, selection module 108 may access a separate copy of the storage tiering policies of the second file system. Additionally or alternatively, selection module 108 may identify storage tiering policies that are not native to the second file system but which selection module 108 has been configured to apply to the second file system.

After identifying the storage tiering policy for the second file system, selection module 108 may select the storage tier for the file by applying the file metadata to the storage tiering policy. For example, the storage tiering policy may make use of any of the examples of metadata described earlier. In one example, the storage tiering policy may specify that files with recent access times be stored on a high-performance storage tier. In another example, the storage-tiering policy may specify that files with certain file owners be stored on a high-security storage tier.

Returning to FIG. 3, at step 308 one or more of the systems described herein may write the file directly to the storage tier within the second file system to avoid moving the file to the storage tier after writing the file to the second file system. For example, at step 308 writing module 110 may, as part of computing system 202, write file 212 directly to storage tier 220(1) to avoid moving file 212 to storage tier 220(1) after writing file 212 to file system 220. Using FIG. 4 as another example, at step 308 writing module 110 may, as a part of computing system 402, write file 416 directly to storage tier 434.

Writing module 110 may to write the file to the storage tier in any of a variety of contexts. For example, writing module 110 may write the file to the storage tier within the second file system while the first file system is online. For example, FIG. 4 illustrates an application 450 on computing system 402 with access to file system 410. Writing module 110 may write file 416 to storage tier 434 without taking file system 410 offline and disrupting the access of application 450 to file system 410. In this manner, embodiments of the instant disclosure may provide online migration of one or more files without degrading application performance (e.g., without the need for additional I/O to reallocate files to appropriate storage tiers after the files have been migrated to a new system).

Providing online migration without degrading application performance may be useful in a variety of contexts. For example, when an outdated storage system is to be replaced, the outdated storage system may be left online with data readily accessible while data is being migrated from the outdated storage system to the replacement storage system. Providing online migration without degrading application performance may also be useful in any other situation in which an existing file system is being migrated from one device to another device (e.g., to switch file system types).

In some examples, writing module 110 may write the file to the storage tier without first writing the file to a second storage tier within the plurality of storage tiers. Using FIG. 4 as an example, writing module 110 may write file 416 to storage tier 434 without first writing file 416 to storage tier 432. As depicted in FIG. 4, storage tier 432 may correspond to a storage device 442 and storage tier 434 may correspond to a storage device 444. Accordingly, file 416 may be stored on storage device 444 without ever having been stored on storage device 442, because writing module 110 may write file 416 directly to the correct storage tier.

Likewise, writing module may write files 412 and 424 directly to storage tier 432, based on their respective access times 414 and 426, and a file 420 directly to storage tier 434, based on an access time 422. For example, access times 414 and 426 may represent recent access times and access times 418 and 422 may represent less recent access times. A tiered storage policy of tiered storage file system 430 may specify that files with recent access times are to be stored on storage tier 432 corresponding to storage device 442 because storage device 442 may have a quick response time. The tiered storage policy may specify that files with less recent access times are to be stored on storage tier 434 corresponding to storage device 444 because storage device 444 may have a slow response time. After step 308, method 300 may terminate.

As explained in detail above, by writing files directly to the correct storage tier during migration instead of simply writing the files to the target file system and leaving the tiered storage system to move the files to the correct storage tier, these systems and methods may eliminate the input/output operations that the tiered storage system would otherwise perform to move the files. Additionally, by using the file metadata from the source file system (which may otherwise be lost) to determine the correct storage tier, these systems and methods may outperform the tiered storage system in selecting a storage tier. For example, a source file system with 20 gigabytes of files may include 5 gigabytes of file data requiring tier-1 storage and 15 gigabytes of data which only requires tier-2 storage. A target file system may make use of two such storage tiers. The systems and methods described herein may store the data from the source file system on the target file system according to relocation placement policies of the tiered storage system while avoiding a read and write of file data during ordinary placement policy enforcement.

Figure 5:
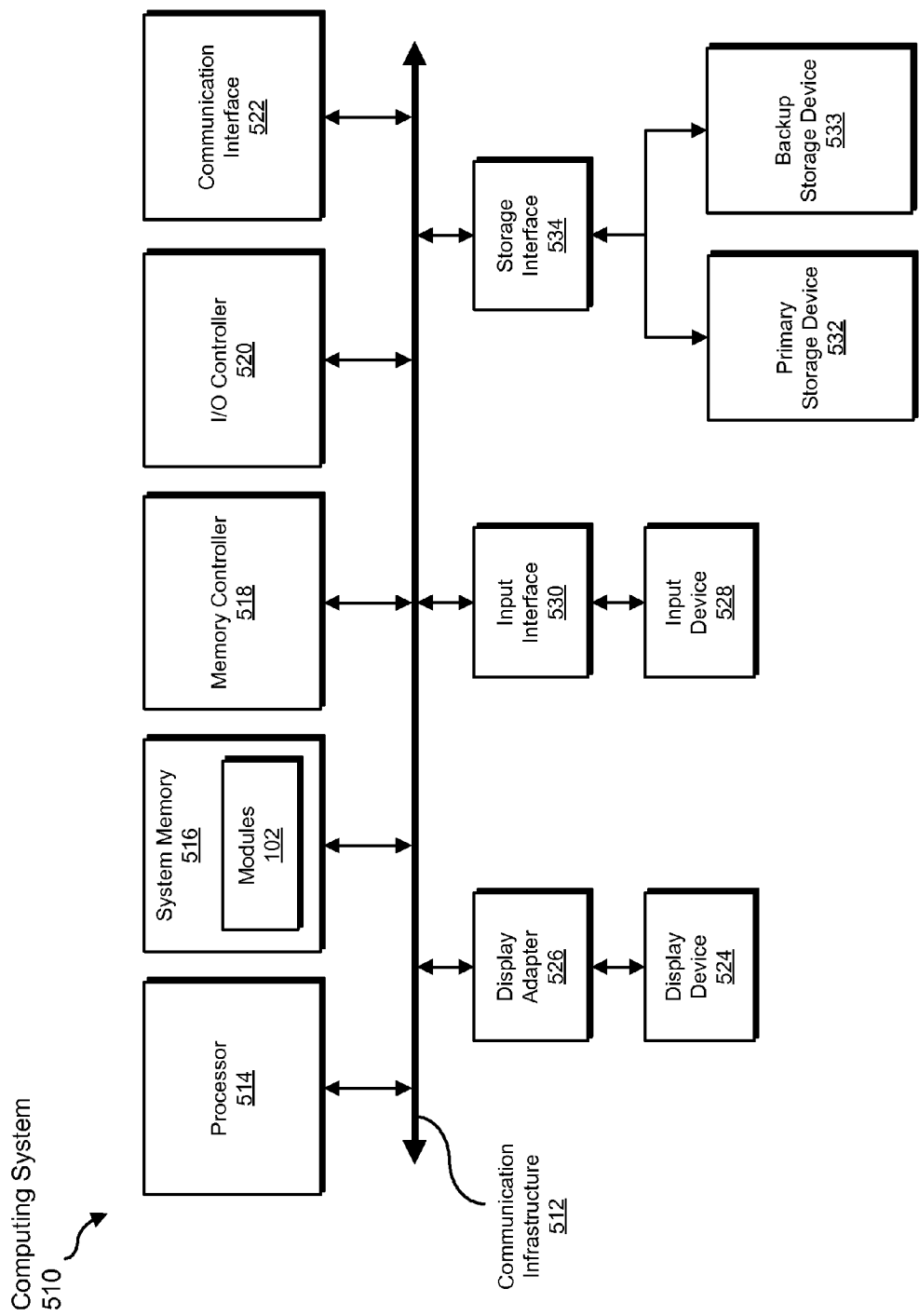
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, selecting, and/or writing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, selecting, and/or writing.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, selecting, and/or writing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, selecting, and/or writing steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, selecting, and/or writing steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, selecting, and/or writing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
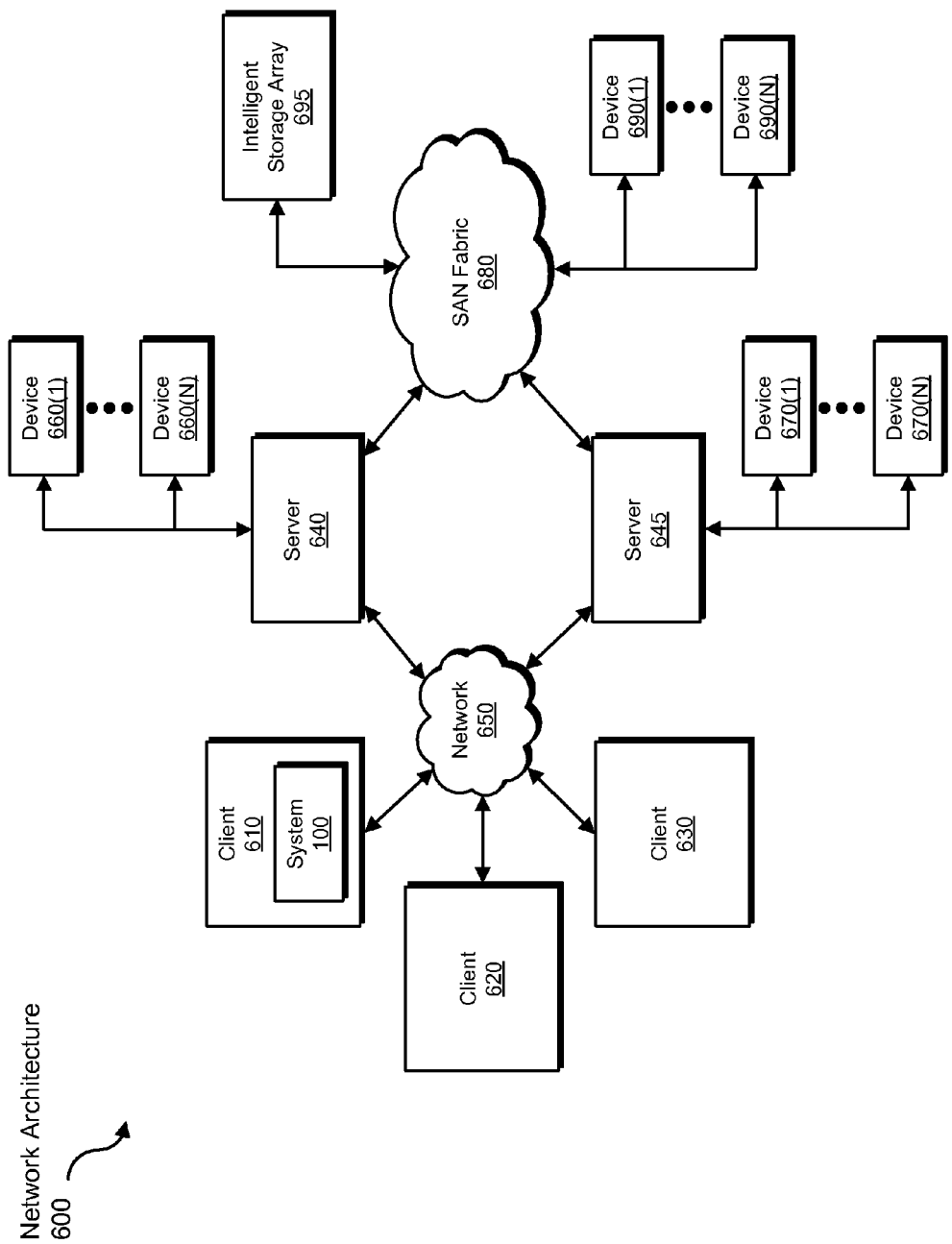
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690 (1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, selecting, and/or writing steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for migrating files to tiered storage systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a computing system into a computing system for efficiently migrating files to tiered storage systems.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for migrating files to tiered storage systems, at least a portion of the method being performed by a computing device comprising at least one processor, the method comprising:
   receiving, as part of a file-migrating system, a request to migrate a file from a first file system of a first computing system to a second file system of a second computing system, wherein:
      the second file system includes a plurality of storage tiers;
      a tiered storage system manages placement of files stored to the second file system among the plurality of storage tiers;
      the tiered storage system is separate and distinct from the file-migrating system;
      writing the file to the second file system may result in:
         the file being written to an incorrect storage tier within the second file system;
         the tiered storage system moving the file from the incorrect storage tier to a correct storage tier within the second file system;
   during migration of the first file system to the second file system and as part of the file-migrating system:
      identifying file metadata associated with the file as stored on the first file system,
      before writing any portion of the file to the second file system, selecting the correct storage tier from the plurality of storage tiers based at least in part on the file metadata by:
         identifying at least one storage tiering policy that indicates how the tiered storage system distributes files among the plurality of storage tiers of the second file system;
         selecting the correct storage tier for the file by applying the file metadata to the storage tiering policy before writing any portion of the file to the second file system, wherein the step of identifying the storage tiering policy and the step of applying the file metadata to the storage tiering policy are performed by the file-migrating system instead of the tiered storage system; and
      writing the file directly to the correct storage tier within the second file system to avoid causing the tiered storage system to move the file from the incorrect storage tier to the correct storage tier after writing the file to the second file system.

2. The computer-implemented method of claim 1, wherein:
   the file metadata includes an access time of the file;
   selecting the correct storage tier from the plurality of storage tiers comprises selecting the correct storage tier based on the access time.

3. The computer-implemented method of claim 1, wherein the file metadata includes a temperature score indicating a combination of how frequently and recently the file has been accessed.

4. The computer-implemented method of claim 1, wherein the storage tiering policy comprises a storage tiering policy of the tiered storage system.

5. The computer-implemented method of claim 1, wherein writing the file directly to the correct storage tier within the second file system comprises writing the file to the correct storage tier within the second file system while the first file system is online.

6. The computer-implemented method of claim 1, wherein the steps of receiving, identifying, selecting, and writing are performed by the file-migrating system instead of the tiered storage system.

7. The computer-implemented method of claim 1, wherein:
   receiving the request to migrate the file from the first file system to the second file system comprises receiving a request to restore a backup of the file to the second file system;
   identifying the file metadata associated with the file as stored on the first file system comprises identifying the file metadata preserved in the backup of the file.

8. The computer-implemented method of claim 1, wherein:
   the file metadata associated with the file comprises:
      metadata of the first file system;
      a type of metadata used by the tiered storage system to manage placement of files stored to the second file system among the plurality of storage tiers;
   writing the file to the second file system may result in the file metadata being lost.

9. A system for migrating files to tiered storage systems, the system comprising:
   an identification module programmed to receive, at a file-migrating system, a request to migrate a file from a first file system of a first computing system to a second file system of a second computing system, wherein:
      the second file system includes a plurality of storage tiers;

a tiered storage system manages placement of files stored to the second file system among the plurality of storage tiers;

the tiered storage system is separate and distinct from the file-migrating system;

writing the file to the second file system may result in:
the file being written to an incorrect storage tier within the second file system;
the tiered storage system moving the file from the incorrect storage tier to a correct storage tier within the second file system;

a metadata module programmed to, during migration of the first file system to the second file system, identify file metadata associated with the file as stored on the first file system;

a selection module programmed to, during the migration and before writing any portion of the file to the second file system, select the correct storage tier from the plurality of storage tiers based at least in part on the file metadata by:
identifying at least one storage tiering policy that indicates how the tiered storage system distributes files among the plurality of storage tiers of the second file system;
selecting the correct storage tier for the file by applying the file metadata to the storage tiering policy before writing any portion of the file to the second file system, wherein the step of identifying the storage tiering policy and the step of applying the file metadata to the storage tiering policy are performed at the file-migrating system instead of the tiered storage system;

a writing module programmed to, during the migration, write the file directly to the correct storage tier within the second file system to avoid causing the tiered storage system to move the file from the incorrect storage tier to the correct storage tier after writing the file to the second file system;

at least one processor configured to execute the identification module, the metadata module, the selection module, and the writing module, wherein the identification module, the metadata module, the selection module, and the writing module comprise at least a portion of the file-migrating system.

10. The system of claim 9, wherein:
the first file system is a different type of file system than the second file system;
the migration from the first file system to the second file system is performed to change file system types.

11. The system of claim 9, wherein the file metadata includes a temperature score indicating a combination of how frequently and recently the file has been accessed.

12. The system of claim 9, wherein the storage tiering policy comprises a storage tiering policy of the tiered storage system.

13. The system of claim 9, wherein:
the writing module is programmed to write the file directly to the correct storage tier within the second file system by writing the file to the correct storage tier within the second file system while the first file system is online;
the first file system comprises an outdated storage system;
the second file system comprises a replacement storage system that is to replace the outdated storage system.

14. The system of claim 9, wherein:
the file metadata associated with the file comprises:
metadata of the first file system;
a type of metadata used by the tiered storage system to manage placement of files stored to the second file system among the plurality of storage tiers;
writing the file to the second file system may result in the file metadata being lost.

15. The system of claim 9, wherein the identification module is programmed to receive the request to migrate the file from the first file system to the second file system by receiving a request to restore a backup of the file to the second file system.

16. The system of claim 9, wherein the metadata module is programmed to identify the file metadata associated with the file as stored on the first file system by identifying the file metadata preserved in a backup of the file.

17. A non-transitory computer-readable-storage medium comprising one or more computer-executable instructions that, when executed by at least one processor of a computing device, cause the computing device to:
receive, as part of a file-migrating system, a request to migrate a file from a first file system of a first computing system to a second file system of a second computing system, wherein:
the second file system includes a plurality of storage tiers;
a tiered storage system manages placement of files stored to the second file system among the plurality of storage tiers;
the tiered storage system is separate and distinct from the file-migrating system;
writing the file to the second file system may result in:
the file being written to an incorrect storage tier within the second file system;
the tiered storage system moving the file from the incorrect storage tier to a correct storage tier within the second file system;
during migration of the first file system to the second file system and as part of the file-migrating system:
identify file metadata associated with the file as stored on the first file system,
before writing any portion of the file to the second file system, select the correct storage tier from the plurality of storage tiers based at least in part on the file metadata by:
identifying at least one storage tiering policy that indicates how the tiered storage system distributes files among the plurality of storage tiers of the second file system;
selecting the correct storage tier for the file by applying the file metadata to the storage tiering policy before writing any portion of the file to the second file system, wherein the step of identifying the storage tiering policy and the step of applying the file metadata to the storage tiering policy are performed by the file-migrating system instead of the tiered storage system; and
write the file directly to the correct storage tier within the second file system to avoid causing the tiered storage system to move the file from the incorrect storage tier to the correct storage tier after writing the file to the second file system.

18. The non-transitory computer-readable-storage medium of claim 17, wherein:
the file metadata includes an access time of the file;
selecting the correct storage tier from the plurality of storage tiers comprises selecting the correct storage tier based on the access time.

* * * * *